US008526038B2

United States Patent
Ida et al.

(10) Patent No.: US 8,526,038 B2
(45) Date of Patent: Sep. 3, 2013

(54) TRANSMITTING A PRINT JOB, INCLUDING DESTINATION INFORMATION, FROM A NETWORK TERMINAL TO A PRINTING APPARATUS THROUGH A PRINT SERVER

(75) Inventors: Toshihiro Ida, Tokyo (JP); Kazuhiro Ogura, Kanagawa-ken (JP); Shinji Makishima, Tokyo (JP); Akihiro Mizutani, Kanagawa-ken (JP); Yusuke Hamada, Saitama-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 893 days.

(21) Appl. No.: 12/692,990

(22) Filed: Jan. 25, 2010

(65) Prior Publication Data

US 2010/0188699 A1    Jul. 29, 2010

Related U.S. Application Data

(60) Provisional application No. 61/147,299, filed on Jan. 26, 2009.

(51) Int. Cl.
*G06F 3/12* (2006.01)
(52) U.S. Cl.
USPC .......................................................... 358/1.15
(58) Field of Classification Search
USPC .......................................................... 358/1.15
See application file for complete search history.

(56) References Cited

U.S. PATENT DOCUMENTS

| 5,978,560 | A  | * | 11/1999 | Tan et al. ..................... 358/1.15 |
| 2003/0214657 | A1 | * | 11/2003 | Stringham ..................... 358/1.1 |
| 2008/0068650 | A1 | * | 3/2008 | Negoro ......................... 358/1.15 |
| 2008/0170253 | A1 | * | 7/2008 | Mohammad ..................... 358/1.15 |
| 2008/0170259 | A1 | * | 7/2008 | Koshika et al. ............... 358/1.15 |
| 2009/0168100 | A1 | * | 7/2009 | Huster ......................... 358/1.15 |
| 2009/0257082 | A1 | * | 10/2009 | Kohli et al. .................. 358/1.15 |
| 2010/0202013 | A1 | * | 8/2010 | Huster ......................... 358/1.15 |

FOREIGN PATENT DOCUMENTS

JP    2007034493    2/2007

* cited by examiner

*Primary Examiner* — Eric A Rust
(74) *Attorney, Agent, or Firm* — Turocy & Watson, LLP

(57) ABSTRACT

The present invention provides a technique capable of preventing, in a system that transmits a print job from a network terminal to a printing apparatus through a print job managing server, useless consumption of a storage area of the printing apparatus and an unnecessary increase in traffic in a network. A print job managing server includes: a transmission-destination-information acquiring unit configured to acquire job transmission destination information for specifying at least one printing apparatus that is a job transmission destination associated in advance with information concerning a transmission source of a print job; and a job transmitting unit configured to transmit the print job to the printing apparatus, which is the job transmission destination, on the basis of the acquired job transmission destination information.

18 Claims, 16 Drawing Sheets

FIG. 4

| PRINTING APPARATUS NAME | PRINTING APPARATUS ID | ADDRESS | STAPLE |
|---|---|---|---|
| MFP001 | 001 | 192.168.0.2 | ○ |
| MFP002 | 002 | 192.168.0.3 | × |
| MFP003 | 003 | 192.168.0.4 | ○ |

FIG. 5

| USER NAME | PRINTING APPARATUS ID | USER PASSWORD | AUTHENTICATION ID |
|---|---|---|---|
| UserA | 001、003 | ****** | ********** |
| UserB | 001、002 | ****** | ********** |

FIG. 6

| USER NAME | IMAGING FILE NAME | NUMBER OF COPIES | COLOR | DUPLEX | Nin1 | PRINT JOB NAME |
|---|---|---|---|---|---|---|
| UserA | Imagingfile001 | 3 | MONOCHROME | ○ | 1in1 | Document001 |
| UserB | Imagingfile003 | 10 | COLOR | × | 2in1 | Document003 |

FIG. 7

| USER NAME | PRINT JOB NAME |
|---|---|
| UserA | Document001 |
| UserB | Document003 |

FIG.16

| TITLE (PRINT JOB NAME) | NUMBER OF COPIES | COLOR | DUPLEX | Nin1 |
|---|---|---|---|---|
| Document001 | 3 | MONOCHROME | ○ | 1in1 |
| Document003 | 10 | COLOR | × | 2in1 |
| Document010 | 1 | MONOCHROME | × | 1in1 |

USER A

LOCAL

THREE JOBS ARE KEPT

DELETE | CANCEL SELECTION | SELECT ALL | PRINT

US 8,526,038 B2

TRANSMITTING A PRINT JOB, INCLUDING DESTINATION INFORMATION, FROM A NETWORK TERMINAL TO A PRINTING APPARATUS THROUGH A PRINT SERVER

CROSS-REFERENCE TO RELATED APPLICATION

This application is based upon and claims the benefit of priority from: U.S. provisional application 61/147,299, filed on Jan. 26, 2009, the entire contents of each of which are incorporated herein by reference.

TECHNICAL FIELD

This specification relates to a technique for transmitting a print job from a network terminal to a printing apparatus through a print server.

BACKGROUND

In the past, there is known a technique for transferring a print jot, which is transmitted from a network terminal such as a client PC to a print server, to all printing apparatuses communicatably network-connected to the print server through the print server to thereby cause the printing apparatuses to keep the print job (see JP-A-2007-34493).

Consequently, a user can cause, by operating the printing apparatuses later, the printing apparatuses to execute print processing by the print job at arbitrary timing without worrying about time required for transmission of print job data from the PC to the printing apparatuses.

However, in the related art, the user sends the print job to all the printing apparatuses connected to the print server. Therefore, for example, a print job transmitted to a printing apparatus rarely used by the user uselessly consumes a storage area of the printing apparatus.

If the user sends a print job even to a printing apparatus that the user is extremely less likely to cause to execute print processing, this leads to an unnecessary increase in traffic on the network.

SUMMARY

To solve the problems, this specification relates to a technique capable of preventing, in a system that transmits a print job from a network terminal to a printing apparatus through a print server, useless consumption of a storage area of the printing apparatus and an unnecessary increase in traffic in a network.

This specification relates to a print job managing server including: a job receiving unit configured to receive a print job; a transmission-destination-information acquiring unit configured to acquire job transmission destination information which specifies at least one printing apparatus that is a job transmission destination associated in advance with information concerning a transmission source of the print job received by the job receiving unit; and a job transmitting unit configured to transmit the print job to the printing apparatus, which is the job transmission destination, on the basis of the job transmission destination information acquired by the transmission-destination-information acquiring unit.

This specification relates to a computer-readable storage medium having stored therein a computer program for causing a computer to execute processing for: receiving a print job; acquiring job transmission destination information which specifies at least one printing apparatus that is a job transmission destination associated in advance with information concerning a transmission source of the received print job; and transmitting the print job to the printing apparatus, which is the job transmission destination, on the basis of the acquired job transmission destination information.

This specification relates to a print job managing method including: receiving a print job; acquiring job transmission destination information which specifies at least one printing apparatus that is a job transmission destination associated in advance with information concerning a transmission source of the received print job; and transmitting the print job to the printing apparatus, which is the job transmission destination, on the basis of the acquired job transmission destination information.

DESCRIPTION OF THE DRAWINGS

FIG. 4 is a diagram of an example of a data table managed by a printing-apparatus managing unit 106;

FIG. 5 is a diagram of an example of a data table managed by a setting registering unit 105;

FIG. 6 is a diagram of an example of an imaging file management table managed by an imaging-file managing unit 109;

FIG. 7 is a diagram of an example of a table managed by a job accumulating unit 102;

FIG. 16 is a diagram of a user interface for showing print jobs accumulated in the print job managing server 1 using display units and operation input units in printing apparatuses.

DETAILED DESCRIPTION

Embodiments of the present invention are explained below with reference to the accompanying drawings.

Figure 1:
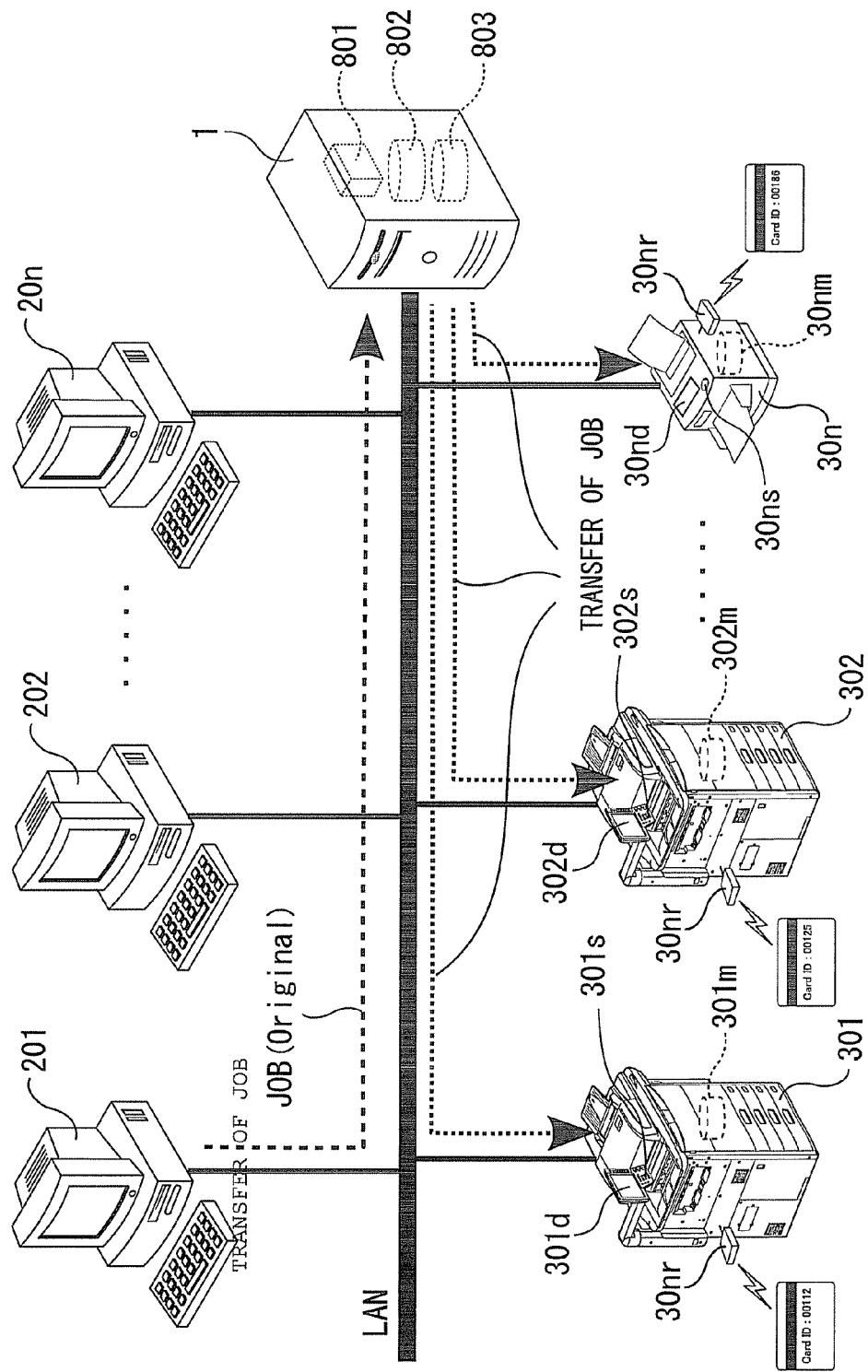
FIG. 1 is a diagram of the configuration of a network print system including a print job managing server 1 according to an embodiment of the present invention.

FIG. 1 is a diagram of the configuration of a network print system including a print job managing server 1 according to an embodiment of the present invention.

The network print system according to this embodiment includes the print job managing server 1, client PCs 201 to 20n, and printing apparatuses 301 to 30n.

The print job managing server 1, the client PCs 201 to 20n, and the printing apparatuses 301 to 30n are connected to be capable of communicating with one another via a network such as a LAN (Local Area Network) or a WAN (Wide Area Network).

The print job managing server 1 has a function of a print server. The print job managing server 1 includes a CPU 801, a memory 802, and a HDD (Hard Disk Drive) 803. For example, the print job managing server 1 can receive print jobs transmitted from the client PCs 201 to 20n through the network and transfer the print jobs to the printing apparatuses 301 to 30n. For example, the print job managing server 1 can receive print jobs transmitted from the client PCs 201 to 20n through the network, accumulate the print jobs in the HDD 803, and transmit the print jobs to the printing apparatuses 301 to 30n in response to, for example, a request from the outside.

The CPU 801 has a role of performing various kinds of processing in the print job managing server 1 and also has a role of realizing various functions by executing computer programs stored in the memory 802.

The memory 802 can include a RAM (Random Access Memory), a ROM (Read Only Memory), a DRAM (Dynamic Random Access Memory), a SRAM (Static Random Access Memory), or a VRAM (Video RAM). The memory 802 has a role of storing various kinds of information and computer programs used in the print job managing server 1.

The HDD 803 has a role of a storage area configured to store various kinds of information (e.g., functions and data tables) and computer programs used in the print job managing server 1.

The client PCs 201 to 20n have a role of terminal apparatuses configured to transmit print jobs to the print job managing server 1.

The printing apparatuses 301 to 30n respectively include display units 301d to 30nd and operation input units 301s to 30ns.

The display units 301d to 30nd can include LCDs (Liquid Crystal Displays), EL (Electro Luminescence) displays, PDPs (Plasma Display Panels), or CRTs (Cathode Ray Tubes).

The operation input units 301s to 30ns can include keyboards, mouses, touch panels, touch pads, or graphics tablets.

The functions of the display units and the operation input units included in the printing apparatuses can be integrally realized by a so-called touch panel display.

In the configuration explained above, print jobs transmitted from the client PCs 201 to 20n to the printing apparatuses 301 to 30n through the print job managing server 1 can be stored in HDDs 301m to 30nm included in the printing apparatuses 301 to 30n that are transmission destinations. A user authenticated by authenticating devices 301r to 30nr included in the printing apparatuses 301 to 30n can cause the printing apparatuses 301 to 30n to execute the print jobs stored in the HDDs 301m to 30nm by operating the operation input units 301s to 30ns.

The "print job" in this embodiment includes, as PJL, a user name (e.g., a login name in a client PC) and various print settings.

Figure 2:
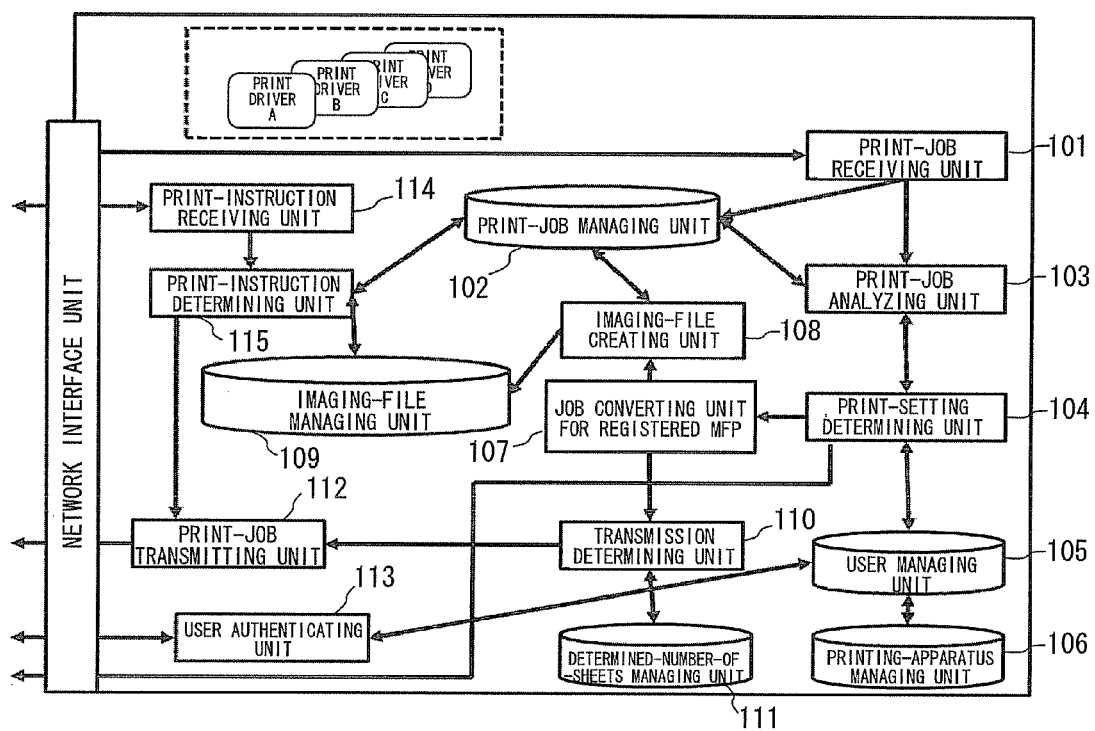
FIG. 2 is a functional block diagram for explaining the print job managing server 1 according to the embodiment.

FIG. 2 is a functional block diagram for explaining the print job managing server 1 according to this embodiment. The print job managing server 1 according to this embodiment includes a print-job receiving unit 101, a job accumulating unit 102, a print-job analyzing unit 103, a print-setting determining unit 104, a setting registering unit 105, a print-ing-apparatus managing unit 106, a job converting unit 107, an imaging-file creating unit 108, an imaging-file managing unit 109, an operation-information acquiring unit 110, a determined-number-of-sheets managing unit 111, a print-job transmitting unit 112, and a user authenticating unit 113.

Specifically, the setting registering unit 105 includes a history-information acquiring unit 105a, a history registering unit 105b, an identification-information acquiring unit 105c, and a setting-information acquiring unit 105d. The print-job analyzing unit 103 includes a volume-information acquiring unit 103a. The print-setting determining unit 104 includes a transmission-destination-information acquiring unit 104a and a sender-information acquiring unit 104b.

The print-job receiving unit 101 receives a print job transmitted from the client PCs 201 to 20n to the print job managing server 1.

Figure 3:
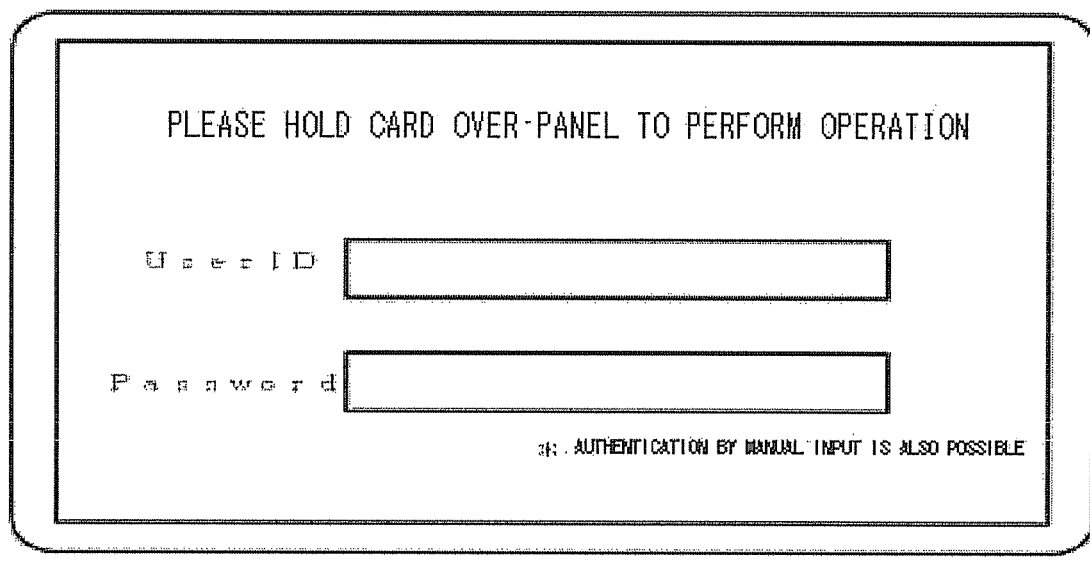
FIG. 3 is a diagram of an example of an input screen for user authentication displayed on a control panel in a printing apparatus.

The user authenticating unit 113 receives an authentication ID acquired from the authenticating devices 301r to 30nr provided in the printing apparatuses 301 to 30n and interrogates the setting registering unit 105. When the authentication ID interrogated by the user authenticating unit 113 conforms to any one of user IDs managed by the setting registering unit 105, the user authenticating unit 113 returns a conforming user name to a printing apparatus that is an acquisition source of the authentication ID. When the authentication ID conforms to none of the user IDs managed by the setting registering unit 105, the user authenticating unit 113 transmits an error code such as "Invalid ID" to the printing apparatus. FIG. 3 is a diagram of an example of an input screen for user authentication displayed on controls panels in the printing apparatuses 301 to 30n.

The sender-information acquiring unit 104b acquires identification information such as a user ID of a user who sends a print job to the print job managing server 1 through the network. The sender-information acquiring unit 104b may acquire, on the basis of data content of a print job received by the print job managing server 1, identification information of a sender of the print job.

The setting-information acquiring unit 105d acquires job transmission destination information on the basis of setting operation by the user.

The setting registering unit 105 registers the identification information acquired by the identification-information acquiring unit 105c and the job transmission destination information acquired by the setting-information acquiring unit 105d in the printing-apparatus managing unit 106 in association with each other.

Specifically, the printing-apparatus managing unit 106 manages "printing apparatus IDs", "network addresses", and "various print settings (settings that can be changed by a print driver such as stapling and hole punching)" in the printing apparatuses 301 to 30n. FIG. 4 is a diagram of an example of a data table managed by the printing-apparatus managing unit 106.

The history-information acquiring unit 105a acquires "transmission history information" for specifying a printing apparatus set as a transmission destination of a print job in the past by a user whose identification information is acquired by the print-setting determining unit 104. FIG. 5 is a diagram of an example of a data table managed by the setting registering unit 105.

The history registering unit 105b registers the identification information acquired by the sender-information acquiring unit 104b and the transmission history information acquired by the history-information acquiring unit 105a in association with each other.

Specifically, the setting registering unit 105 manages "user names", "transmission destination printing apparatus IDs", "user passwords", and "authentication IDs". As the "transmission destination printing apparatus IDs", plural printing apparatuses can be registered for one user.

The print-setting determining unit 104 basically has a role of determining content of print setting of a print job received by the print-job receiving unit 101.

The transmission-destination-information acquiring unit 104a acquires information concerning a transmission source of a print job received by the print-job receiving unit 101 and "job transmission destination information" for specifying at least one printing apparatus that is a job transmission destination. The "job transmission destination information" is registered in the printing-apparatus managing unit 106 in advance in association with the information concerning the transmission source. Examples of the information concerning the transmission source includes a name, an IP address, and a MAC address given to a client PC and an ID of a user who logs in to the client PC.

The transmission-destination-information acquiring unit 104a acquires, among the job transmission destination information registered in the printing-apparatus managing unit 106, "job transmission destination information" associated with "identification information of a user who sends a print job received by the print-job receiving unit 101".

Information for specifying "a printing apparatus that should be set as a transmission destination of a print job when a data volume indicated by volume information acquired by the volume-information acquiring unit 103a exceeds a predetermined volume" can be set as the "job transmission destination information".

The print-setting determining unit 104 interrogates the setting registering unit 105 on the basis of a user name acquired by the print-job analyzing unit 103 analyzing a print job. The print-setting determining unit 104 acquires information for specifying at least one printing apparatus (usually, plural printing apparatuses are registered) allocated to the user in advance (a printing apparatus name, an IP address of the printing apparatus, a MAC address of the printing apparatus, etc.). The print-setting determining unit 104 determines whether the received print job conforms to the registered printing apparatus.

The print-setting determining unit 104 acquires, as transmission destination information, transmission history information registered at a frequency equal to or higher than a predetermined value among the transmission history information registered in association with the identification information of the user who sends the print job received by the print-job receiving unit 101. The "frequency equal to or higher than a predetermined value" means, for example, a state in which the transmission history information is registered a predetermined number of times or more in a predetermined period in the past or a state in which the transmission history information is registered a predetermined number of times or more in the past.

The operation-information acquiring unit 110 acquires, on the basis of the job transmission destination information acquired by the transmission-destination-information acquiring unit 104a, operation information concerning an operation state of a printing apparatus that is a job transmission destination. Examples of the "operation information" includes the number of kinds of processing executed in a target printing apparatus, processing load, content of the processing, and a state of an operation mode set by the user or automatically set.

When there is a printing apparatus to which a print job received by the print-job receiving unit 101 does not conform (hereinafter, "nonconforming apparatus") among printing apparatuses that are job transmission destinations by the print-job transmitting unit 112, the job converting unit 107 converts the print job into a print job of a format conforming to the nonconforming apparatus. "A print job does not conform" means a state in which print processing based on the print job cannot be executed because, for example, a data format of the print job does not conform to the printing apparatus.

If a nonconforming apparatus to which a print job accumulated in the HDD 803 (a storage area) does not conform is present among the printing apparatuses 301 to 30n to which a print job can be transmitted from the print job managing server 1, the imaging-file creating unit 108 converts the print job into an imaging file of PDF or the like.

The imaging-file managing unit 109 stores the imaging file created by the imaging-file creating unit 108 in a state in which the imaging file is associated with the user name acquired by the print-job analyzing unit 103. FIG. 6 is a diagram of an example of an imaging file management table managed by the imaging-file managing unit 109.

The job converting unit 107 converts the imaging file created by the imaging-file creating unit 108 into a print job of a format conforming to the nonconforming apparatus.

In this way, the imaging-file creating unit 108 and the job converting unit 107 convert the print job not conforming to the nonconforming apparatus into the imaging file of PDF or the like and then reconvert the imaging file into a print job conforming to the nonconforming apparatus.

The print-job analyzing unit 103 analyzes a print job received by the print-job receiving unit 101 and extracts a "user name", "print job information", and the like that are various kinds of information included in the print job.

The volume-information acquiring unit 103a acquires, as volume information concerning a data volume of the print job received by the print-job receiving unit 101, for example, the number of printed pages (e.g., the number of copies×the number of sheets) set in the print job.

The job accumulating unit 102 manages print job data received by the print-job receiving unit 101 and a user name acquired as a result of analysis in the print-job analyzing unit 103 in association with each other. FIG. 7 is a diagram of an example of a table managed by the job accumulating unit 102.

When the data volume indicated by the volume information acquired by the volume-information acquiring unit 103a exceeds a predetermined volume (e.g., 150 MB), the job accumulating unit 102 can also cause the HDD 803 (the storage area) to temporarily accumulate the print job having the data volume.

The print-job transmitting unit 112 transmits, on the basis of the "job transmission destination information" acquired by the transmission-destination-information acquiring unit 104a, the print job to a printing apparatus that is a job transmission destination.

The print-job transmitting unit 112 transmits the print job conforming to the nonconforming apparatus obtained as a result of the data conversion processing by the job converting unit 107 to the nonconforming apparatus.

The print-job transmitting unit 112 transmits, on the basis of the operation information acquired by the operation-information acquiring unit 110, the print job only to a printing apparatus having an operating ratio equal to or lower than a predetermined value. Examples of the "operation information" include (1) processing load on a CPU in a target printing apparatus, (2) the number of print jobs in an execution waiting state, and (3) the number of printed sheets in a print job scheduled to be executed.

Examples of a state in which "an operating ratio is equal to or lower than a predetermined value" include a state in which a printing apparatus is in a standby state, a state in which only processing with relatively low load is executed, and a state in which the number of print jobs waiting for execution is equal to or smaller than a predetermined number.

The print-job transmitting unit 112 transmits, to a printing apparatus set in the job transmission destination information in association with a case in which the data volume indicated by the volume information acquired by the volume-information acquiring unit 103a exceeds the predetermined volume (e.g., 150 MB), a print job having a data volume exceeding the predetermined volume. The "predetermined volume" means, for example, the number of printed pages set in a print job or a data size of a part of or the entire print job.

The determined-number-of-sheets managing unit 111 performs, for example, management of information for specifying a data volume of a print job. Information for specifying the "predetermined volume" managed by the determined-number-of-sheets managing unit 111 is registered in the determined-number-of-sheets managing unit 111 according to, for example, an operation input in a printing apparatus by the user.

The print-job transmitting unit 112 transmits, according to a request from any one of the printing apparatuses 301 to 30n, the print job accumulated in the HDD 803 (the storage area) to the printing apparatus that issues the request. When the printing apparatus that issues the print request is a "nonconforming apparatus", the print-job transmitting unit 112 transmits a print job accumulated in the HDD 803 (the storage area) in association with the nonconforming apparatus to the nonconforming apparatus.

The print-instruction receiving unit 114 receives, from a user who succeeds in user authentication in a printing apparatus to which a print job is not transferred, check, editing, print output, deletion, and the like of the print job in the printing apparatus.

The print-instruction determining unit 115 interrogates the imaging-file managing unit 109 and the job accumulating unit 102 concerning a print job of the user and acquires the print job and imaging-file information of the user. The print job and the imaging file information acquired by the print-instruction determining unit 115 in this way are transmitted to the printing apparatus by the print-job transmitting unit 112.

As explained above, in the print job managing server 1 according to this embodiment, print jobs of plural kinds of data formats are generated in the HDD 803 such that, from whichever printing apparatus of plural printing apparatuses network-connected to the print job managing server 1 a print request is received, a print job for which the print request is received can be executed. As the print jobs of the plural kinds of data formats, it is ideal to generate print jobs of kinds of data formats enough for coping with all printing apparatuses that are likely to be caused to execute print processing by print jobs transmitted from the print job managing server 1.

The job accumulating unit 102 causes the HDD 803 or the like to temporarily accumulate a print job received by the print-job receiving unit 101 through the network or a print job generated by the job converting unit 107.

Figure 8:
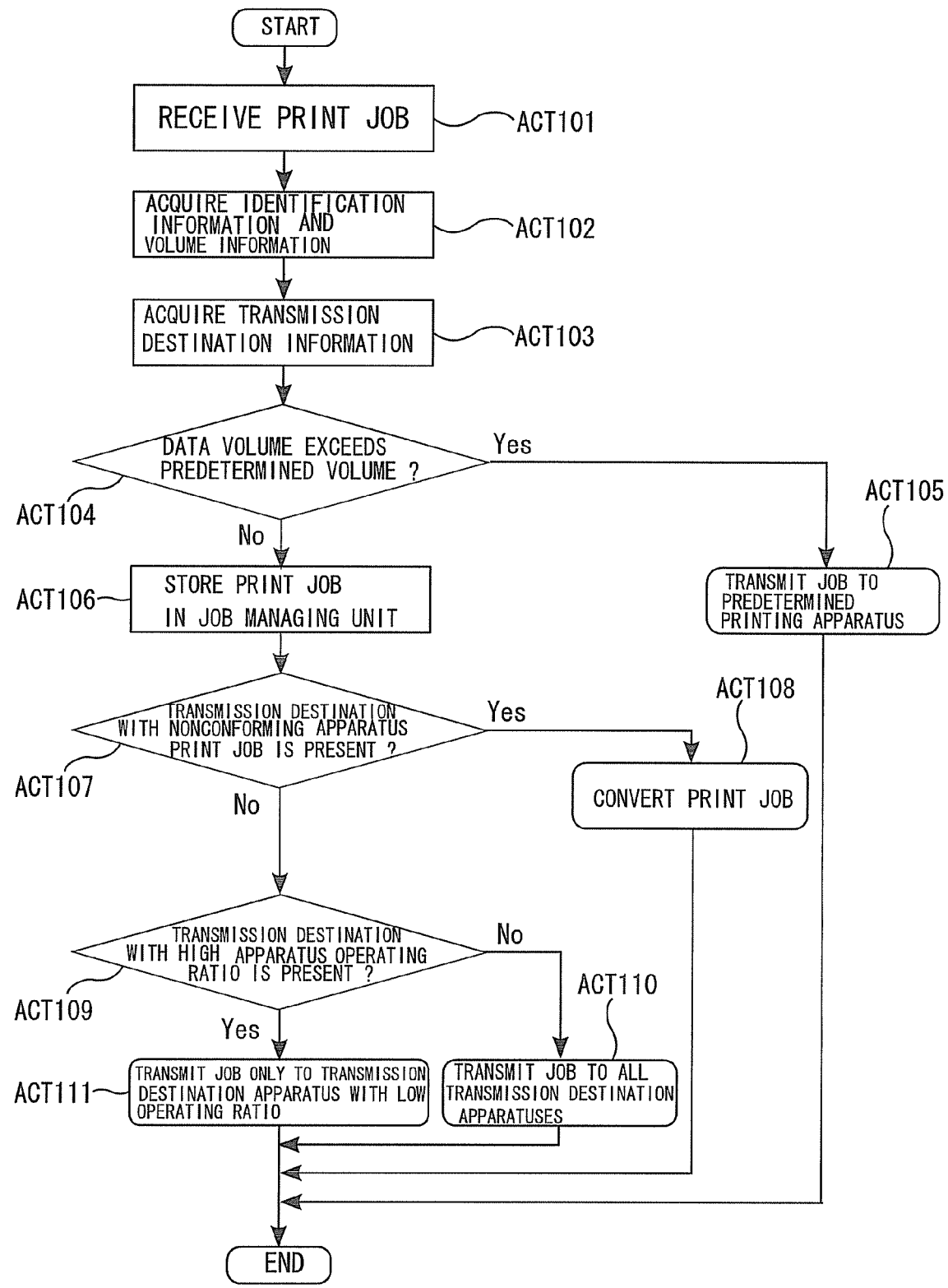
FIG. 8 is a flowchart for explaining a flow of processing in the print job managing server 1 according to the embodiment.

FIG. 8 is a flowchart for explaining a flow of processing in the print job managing server 1 according to this embodiment.

The print job managing server 1 receives, with the print-job receiving unit 101, a print job (PDL) from any one of the client PCs 201 to 20n via a print driver (ACT 101).

Subsequently, the print job managing server 1 analyzes, with the print-job analyzing unit 103, content of the print job received by the print-job receiving unit 101 and acquires user identification information included in the print job or associated with the print job and information indicating a data volume of the print job (ACT 102).

The print job managing server 1 specifies, with the print-setting determining unit 104, on the basis of information of the printing-apparatus managing unit 106 and the setting registering unit 105, printing apparatuses associated in advance with a user who sends the print job (ACT 103).

Figure 9:
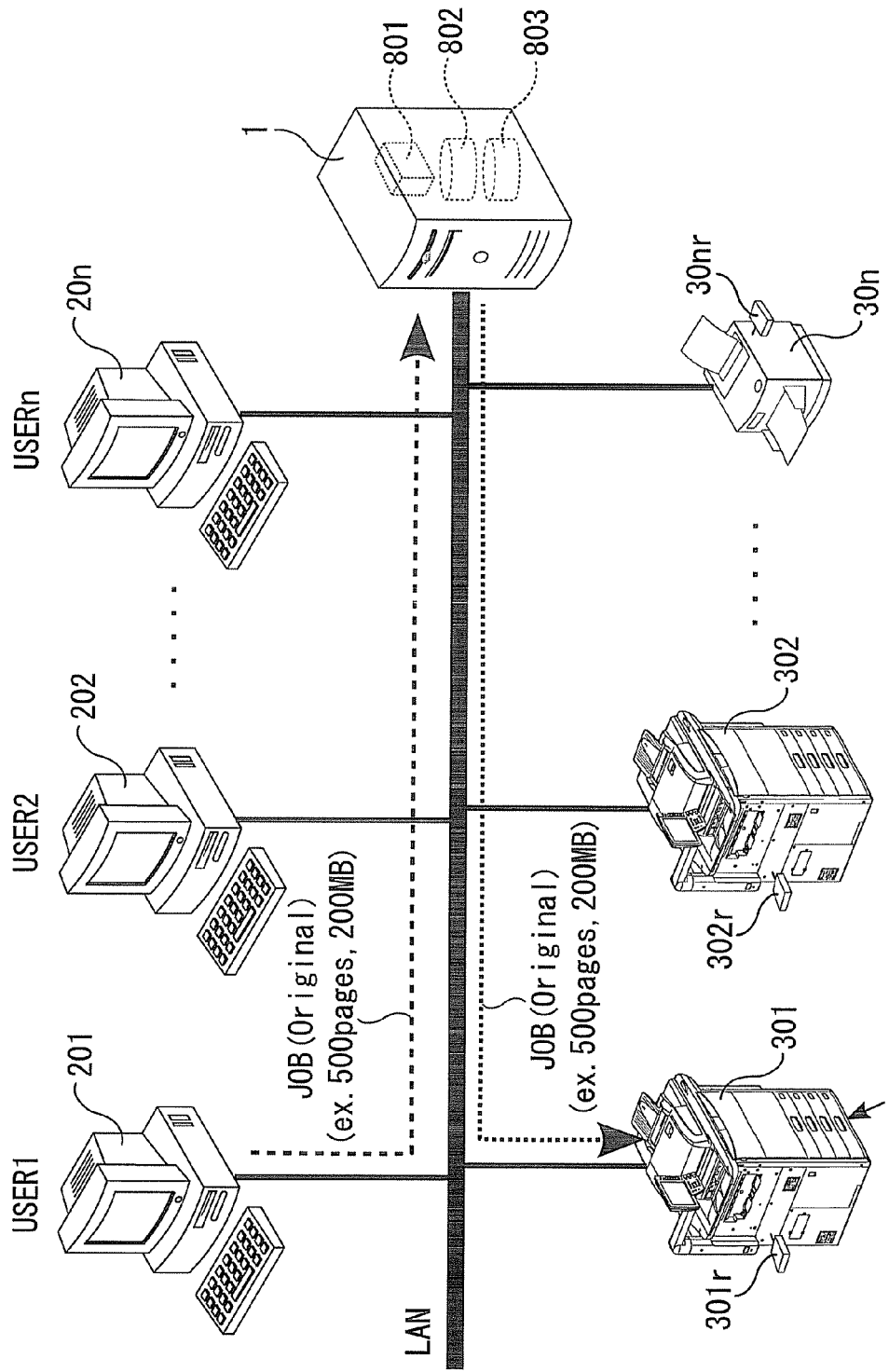
FIG. 9 is a diagram of a state in which a transmission destination of a print job is changed according to a data volume of the print job.

If the data volume of the print job received by the print-job receiving unit 101 is, for example, 200 MB and exceeds the predetermined volume (e.g., 150 MB) (Yes in ACT 104), the print job managing server 1 transmits the print job only to printing apparatuses registered in advance as transmission destinations of such a print job having a large data volume (ACT 105). FIG. 9 is a diagram of a state in which a transmission destination of a print job is changed according to a data volume of the print job.

On the other hand, if the data volume of the print job received by the print-job receiving unit 101 is equal to or smaller than the predetermined volume (e.g., 150 MB) (No in ACT 104), the print job managing server 1 stores the print job in the job managing unit 102 (ACT 106).

Figure 10:
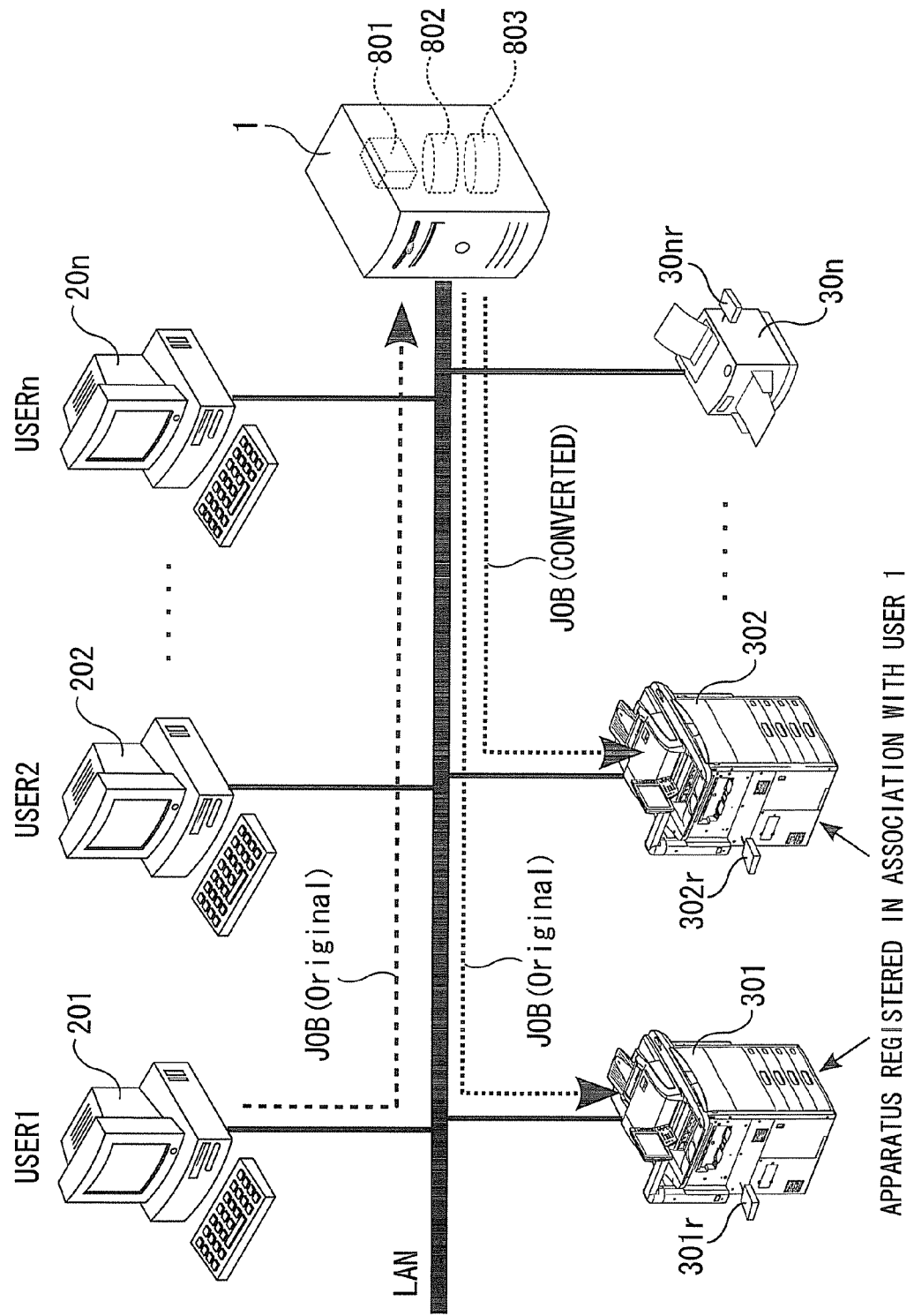
FIG. 10 is a diagram of an example of processing performed when a received print job does not conform to any one of printing apparatuses set and registered as transmission destinations in advance.

If a printing apparatus not applicable to the print driver in the client PC that created the print job is present among the printing apparatuses specified in ACT 103 (Yes In ACT 107), the print job managing server 1 converts, with the job converting unit 107, an imaging file created by the imaging-file creating unit 108 into a data format conforming to the print driver (ACT 108). FIG. 10 is a diagram of an example of processing performed when the received print job does not conform to any one of the printing apparatuses set and registered as transmission destinations in advance.

On the other hand, if a printing apparatus not applicable to the print driver in the client PC that created the print job is not present among the printing apparatuses specified in ACT 103 (No in ACT 107) or when processing for converting the print job into a data format conforming to the printing apparatus is completed (ACT 108), the print-job managing server 1 proceeds to the next processing (ACT 109).

Figure 11:
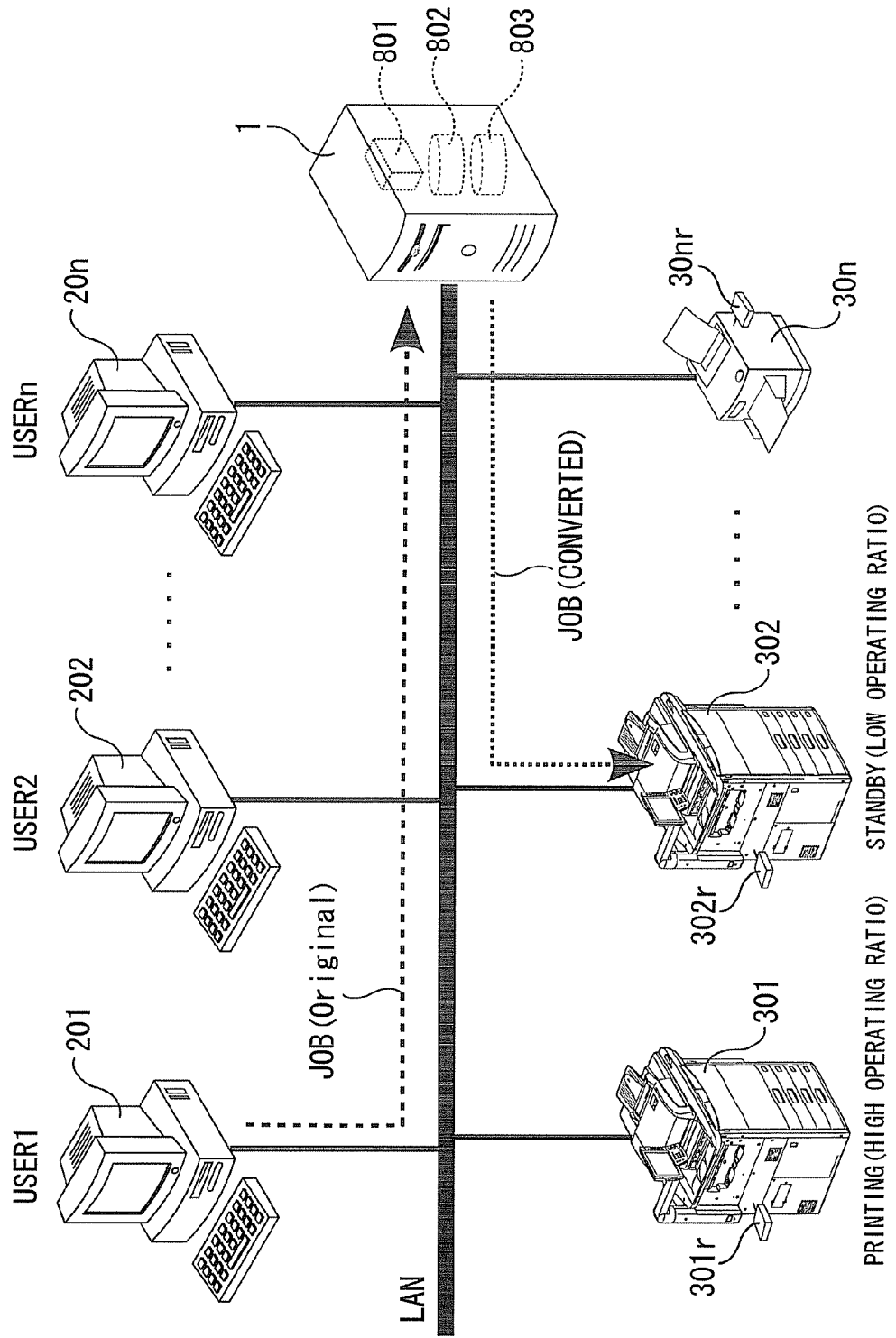
FIG. 11 is a diagram for explaining processing performed when there is a printing apparatus with a high operating ratio among the printing apparatuses set as transmission destinations of a print job.

If a printing apparatus having a high operating ratio (high processing load, high arithmetic operation load, high operation load, etc.) like that during print processing or image processing is present among the printing apparatuses that are transmission destinations of the print job (Yes in ACT 109), the print job managing server 1 transmits the print job to the transmission destinations excluding the printing apparatus having the high operating ratio (ACT 111). FIG. 11 is a diagram for explaining processing performed when a printing apparatus having a high operating ratio is present among the printing apparatuses set as transmission destinations of the print job.

On the other hand, if a printing apparatus having a high operating ratio like that during print processing or during image processing is not present among the printing apparatuses that are the transmission destinations of the print job (No in ACT 109), the print job managing server 1 transmits the print job to all the printing apparatuses specified as the transmission destinations (ACT 110).

In the flowchart shown in FIG. 8, if a data volume of a received print job is large, the print job is transmitted in particular to a printing apparatus registered in association with a large-volume print job. However, the present invention is not always limited to this. For example, if a data volume of print job received by the print-job receiving unit 101 is larger than the predetermined volume, it is also possible to once accumulate the print job in the HDD 803 of the print job managing server 1 without directly transferring the print job to a printing apparatus registered as a predetermined transmission destination and transmit the print job in response to a request from a printing apparatus network-connected to the print job managing server 1.

Figure 12:
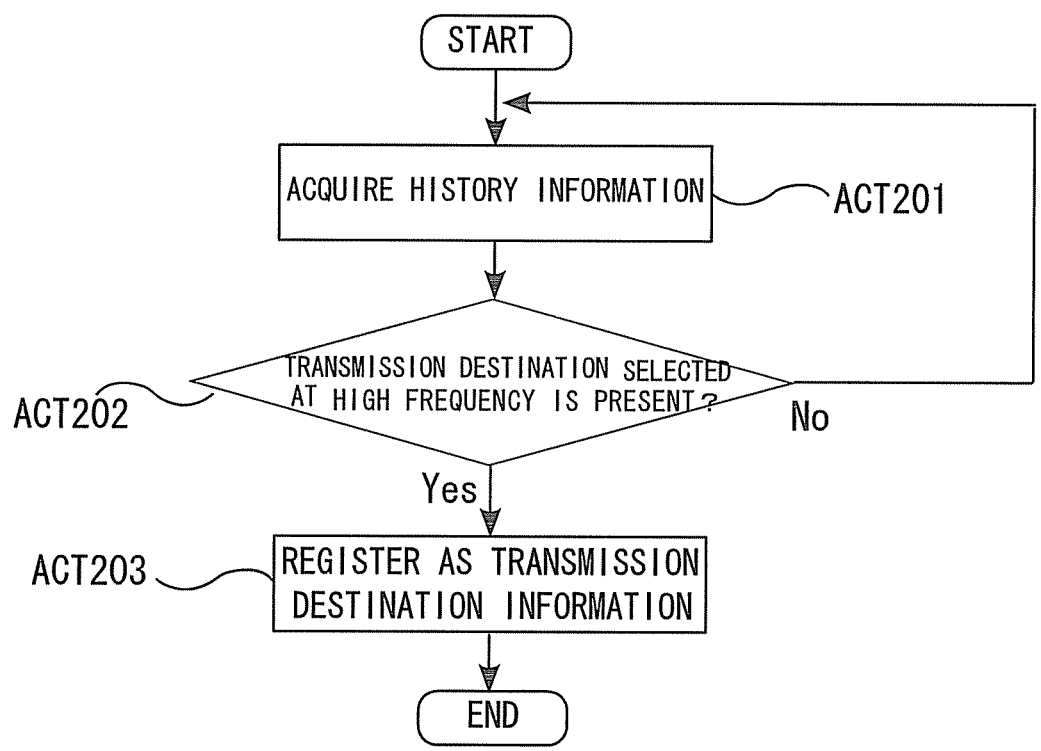
FIG. 12 is a flowchart for explaining a flow of processing for registering, on the basis of a selection history of printing apparatuses by a user, a printing apparatus that is a transmission destination of a print job.

FIG. 12 is a flowchart for explaining a flow of processing for registering, on the basis of a selection history of printing apparatuses by the user, a printing apparatus that is a transmission destination of a print job.

As shown in the figure, the print job managing server 1 can store, concerning print jobs received in the past by the print job managing server 1, identification information of users who transmitted the print jobs and printing apparatuses selected as transmission destinations of the print jobs in, for example, the setting registering unit 105, the printing-apparatus managing unit 106, the HDD 803, and the like in association with each other (ACT 201).

If a printing apparatus selected as a job transmission destination at a high frequency during a predetermined period is present in the history information acquired on the basis of the received print job (Yes in ACT 202), the print job managing server 1 registers the printing apparatus selected as the job transmission destination at the high frequency (ACT 203).

Figure 13:
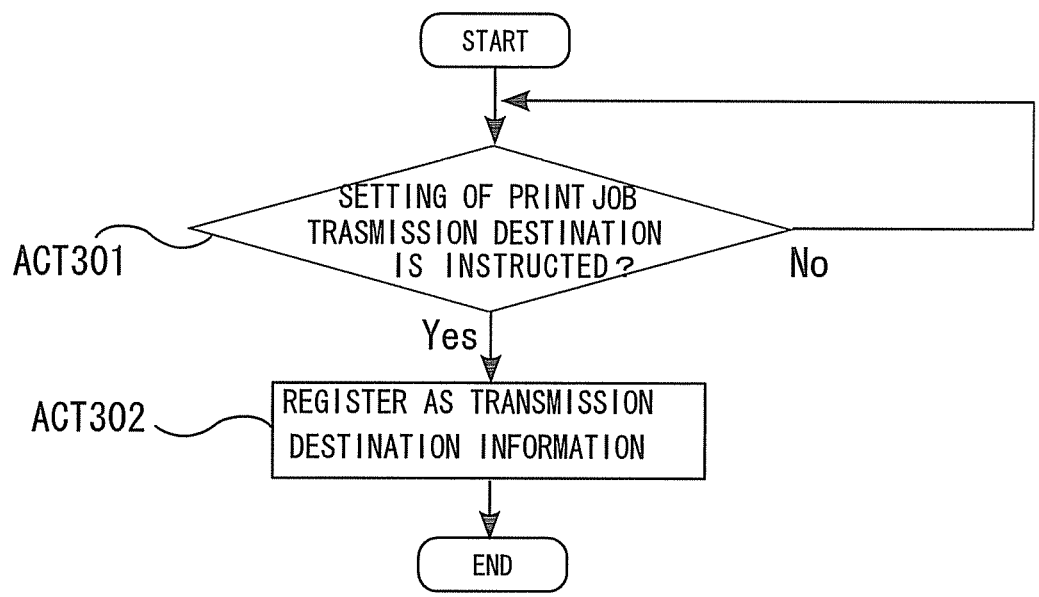
FIG. 13 is a flowchart for explaining a flow of processing for registering, on the basis of an operation input of the user, a printing apparatus that is a transmission destination of a print job.

FIG. 13 is a flowchart for explaining a flow of processing for registering, on the basis of an operation input of the user, a printing apparatus that is a transmission destination of a print job.

If the user designates a printing apparatus, which the user desires to set as a transmission destination of a print job, using a not-shown operation input unit such as a keyboard or a mouse included in any one of the client PCs 201 to 20n or the print job managing server 1 (Yes in ACT 301), the designated printing apparatus is registered as the transmission destination of the print job (ACT 302).

Figure 14:
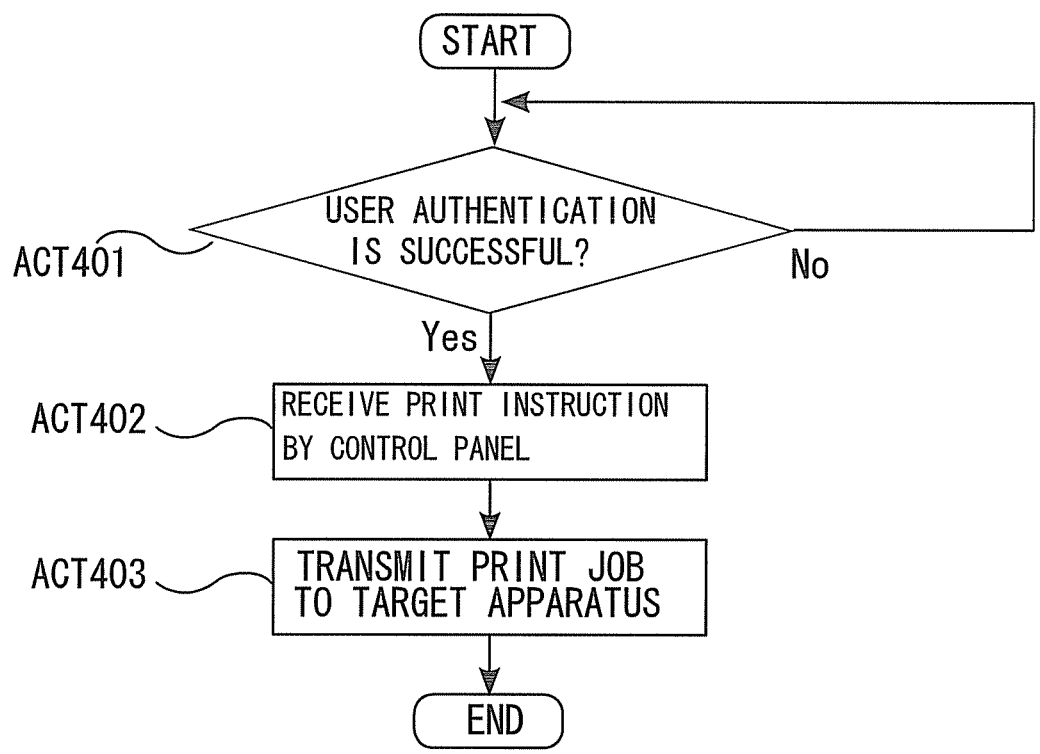
FIG. 14 is a flowchart for explaining a flow of processing performed when an execution request from an external apparatus is received for a print job accumulated in the print job managing server 1.

FIG. 14 is a flowchart for explaining a flow of processing performed when an execution request from an external apparatus is received for a print job accumulated in the print job managing server 1.

First, the authenticating devices 301r to 30nr in the printing apparatuses 301 to 30n perform user authentication (ACT 401).

Figure 15:
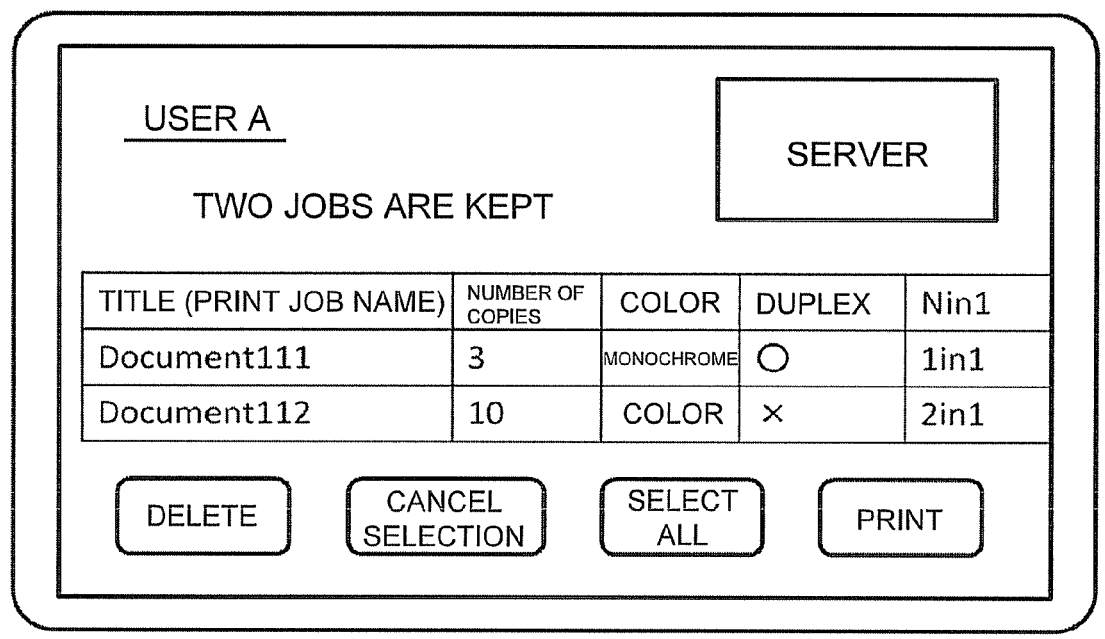
FIG. 15 is a diagram for explaining a screen for showing print jobs received by printing apparatuses from the print job managing server 1 in advance.

When the user authentication is successful (Yes in ACT 401), a screen shown in FIG. 15 for showing print jobs received in advance by the printing apparatuses from the print job managing server 1 is displayed on the display units 301d to 30nd in the printing apparatuses 301 to 30n.

The print-instruction receiving unit 114 receives print instructions to the operation input units 301s to 30ns in the printing apparatuses 301 to 30n on the basis of the print instructions (ACT 402).

When the print job managing server 1 receives the print instructions, the print job managing server 1 analyzes the received print instructions with the print-instruction determining unit 115 and acquires data (print jobs, imaging files, etc.) necessary for execution of print processing in the printing apparatuses that transmit the print instructions. The print job managing server 1 transmits, via the print-job transmitting unit 112, the acquired print jobs or imaging files to the printing apparatuses that transmit the print instructions (ACT 403).

When the print job managing server 1 receives an operation instruction, concerning a print job accumulated in the job accumulating unit 102, the print job managing server 1 directly sends a stored file to the print-job transmitting unit 112. Concerning an imaging file of the imaging-file managing unit 109, the print job managing server 1 specifies a print driver corresponding to the imaging file, processes the imaging file, and sends the imaging file to the print-job transmitting unit 112.

FIG. 16 is a diagram of a user interface for showing print jobs accumulated in the print job managing server 1 using the display units 301d to 30nd and the operation input units 301s to 30ns in the printing apparatus 301 to 30n.

According to the embodiment explained above, it is possible to reduce waiting time for waiting for a print job to be transferred from a network terminal, which transmits the print job, to a desired printing apparatus and prevent a print job transmitted to the print job managing server 1 from being transmitted to even a printing apparatus inappropriate as a transmission destination. Therefore, it is possible to contribute to a reduction in traffic in the network.

In the disclosed embodiments, the processing can be accomplished by a computer-executable program, and this program can be realized in a computer-readable memory device.

In the embodiments, the memory device, such as a magnetic disk, a flexible disk, a hard disk, an optical disk (a CD-ROM, a CD-R, a DVD, and so on), and optical magnetic disk (a MD and so on) can be used to store instructions for causing a processor or a computer to perform the processes described above.

Furthermore, based on an indication of the program installed from the memory device to the computer, an OS (operation system) operating on the computer, or MW (middleware software), such as database management software or network, may execute one part of each processing to realize the embodiments.

The operations in the processing in the print job managing server 1 are realized by causing the CPU 801 to execute a print job managing program stored in the memory 802.

In this embodiment, the "number of printed pages set for a print job" is acquired as volume information. However, the volume information is not always limited to this. The volume information only has to be information that can be used for determining the influence on traffic due to transfer of print job data via the network (e.g., a transfer volume).

The present invention can be carried out in other various forms without departing from the spirit and the main characteristics thereof. Therefore, the embodiment is merely an illustration in every aspect and should not be limitedly interpreted. The scope of the present invention is indicated by the scope of claims and by no means is restricted by the text of the specification. Further, all modifications and various improvements, substitutions, and alterations belonging to the scope of equivalents of the scope of claims are within the scope of the present invention.

As explained in detail above, according to the present invention, it is possible to provide a technique capable of preventing, in a system that transmits a print job from a network terminal to a printing apparatus through a print server, useless consumption of a storage area of the printing apparatus and an unnecessary increase in traffic in a network.

What is claimed is:

1. A print job managing server comprising:
a job receiving unit configured to receive a print job;
a transmission-destination-information acquiring unit configured to acquire job transmission destination information which specifies at least one printing apparatus that is a job transmission destination associated in advance with information concerning a transmission source of the print job received by the job receiving unit; and
a job transmitting unit configured to transmit the print job to the at least one printing apparatus, which is the job transmission destination, on the basis of the job transmission destination information acquired by the transmission-destination-information acquiring unit,
wherein information for specifying a printing apparatus that should be set as a transmission destination of the print job if a data volume of the print job received by the job receiving unit exceeds a predetermined volume is set in the job transmission destination information acquired by the transmission-destination-information acquiring unit, and the job transmitting unit transmits, if it is determined that the data volume of the print job received by the job receiving unit exceeds the predetermined volume, the print job only to the printing apparatus set in the job transmission destination information.

2. The server according to claim 1, further comprising a job converting unit configured to convert, if a nonconforming apparatus to which the print job received by the job receiving unit does not conform is present among printing apparatuses that are job transmission destinations, the print job into a print job of a format conforming to the nonconforming apparatus, wherein the job transmitting unit transmits the print job conforming to the nonconforming apparatus obtained by the job converting unit to the nonconforming apparatus.

3. The server according to claim 2, wherein the job converting unit reconverts, after converting the print job not conforming to the nonconforming apparatus into an imaging file, the imaging file into a print job conforming to the nonconforming apparatus.

4. The server according to claim 1, further comprising an operation-information acquiring unit configured to acquire, on the basis of the job transmission destination information acquired by the transmission-destination-information acquiring unit, operation information concerning an operation state of the printing apparatus that is the job transmission destination, wherein
the job transmitting unit transmits, on the basis of the operation information acquired by the operation-information acquiring unit, the print job only to a printing apparatus having an operating ratio equal to or lower than a predetermined value.

5. The server according to claim 1, further comprising:
a volume-information acquiring unit configured to acquire volume information concerning the data volume of the print job received by the job receiving unit; and
a job accumulating unit configured to cause, if the data volume indicated by the volume information acquired by the volume-information acquiring unit exceeds a predetermined volume, a predetermined storage area to temporarily accumulate the print job having the data volume, wherein
the job transmitting unit transmits, in response to a request from a printing apparatus, the print job accumulated in the storage area to the printing apparatus that made the request.

6. The server according to claim 5, wherein the volume information is a number of printed pages set in the print job.

7. The server according to claim 1, further comprising a volume-information acquiring unit configured to acquire volume information indicating the data volume of the print job received by the job receiving unit, wherein the volume information is a number of printed pages set in the print job.

8. The server according to claim 1, further comprising a job accumulating unit configured to cause a predetermined storage area to temporarily accumulate the print job received by the job receiving unit, wherein the job transmitting unit transmits, in response to a request from a printing apparatus, the print job accumulated in the storage area to the printing apparatus that made the request.

9. The server according to claim 1, further comprising a job converting unit configured to convert, if a nonconforming apparatus to which a print job accumulated in a storage area does not conform is present among printing apparatuses to which a print job can be transmitted from the server, the print job into a print job of a format conforming to the nonconforming apparatus, wherein
the job accumulating unit causes a predetermined storage area to temporarily accumulate the print job generated by the job converting unit, and
the job transmitting unit transmits, in response to a request from the nonconforming apparatus, the print job accumulated in the storage area in association with the nonconforming apparatus to the nonconforming apparatus.

10. The server according to claim 1, further comprising:
an identification-information acquiring unit configured to acquire identification information of a user;
a setting-information acquiring unit configured to acquire the job transmission destination information on the basis of a setting operation of the user; and
a setting registering unit configured to register the identification information acquired by the identification-information acquiring unit and the job transmission destination information acquired by the setting-information acquiring unit in association with each other, wherein
the transmission-destination-information acquiring unit acquires, among the job transmission destination information registered by the setting registering unit, job transmission destination information associated with the identification information of the user who sends the print job received by the job receiving unit.

11. The server according to claim 1, further comprising:
a sender-information acquiring unit configured to acquire identification information of a user who sends a print job to the server;
a history-information acquiring unit configured to acquire transmission history information for specifying a printing apparatus that is set as a transmission destination of a print job in the past by the user whose identification information is acquired by the sender-information acquiring unit; and
a history registering unit configured to register the identification information acquired by the sender-information acquiring unit and the transmission history information acquired by the history-information acquiring unit in association with each other, wherein
the transmission-destination-information acquiring unit acquires, among the transmission history information registered in association with the identification information of the user who sends the print job received by the job receiving unit, transmission history information registered at a frequency equal to or higher than a predetermined value as transmission destination information.

12. A print job managing method comprising:
receiving, using a CPU, a print job;
acquiring, using the CPU, job transmission destination information which specifies at least one printing apparatus that is a job transmission destination associated in advance with information concerning a transmission source of the received print job; and
transmitting, using the CPU, the print job to the at least one printing apparatus, which is the job transmission destination, on the basis of the acquired job transmission destination information,
wherein further comprising: setting, in the acquired job transmission destination information, information for specifying a printing apparatus that should be set as a transmission destination of the print job if a data volume of the received print job exceeds a predetermined volume; and transmitting, using the CPU, if it is determined that the data volume of the received print job exceeds the predetermined volume, the print job only to the printing apparatus set in the job transmission destination information.

13. The method according to claim 12, further comprising:
acquiring, on the basis of the acquired job transmission destination information, operation information concerning an operation state of the printing apparatus that is the job transmission destination; and
transmitting, on the basis of the acquired operation information, the print job only to a printing apparatus having an operating ratio equal to or lower than a predetermined value.

14. The method according to claim 12, further comprising:
acquiring volume information concerning the data volume of the received print job;
causing, if the data volume indicated by the acquired volume information exceeds a predetermined volume, a predetermined storage area to temporarily accumulate the print job having the data volume; and
transmitting, in response to a request from a printing apparatus, the print job accumulated in the storage area to the printing apparatus that made the request.

15. The method according to claim 14, wherein the volume information is a number of printed pages set in the print job.

16. The method according to claim 12, further comprising acquiring volume information indicating the data volume of the received print job, wherein the volume information is a number of printed pages set in the print job.

17. A non-transitory computer-readable storage medium having stored therein a computer program for causing a computer to execute processing for:
receiving a print job; acquiring job transmission destination information which specifies at least one printing apparatus that is a job transmission destination associated in advance with information concerning a transmission source of the received print job; and
transmitting the print job to the at least one printing apparatus, which is the job transmission destination, on the basis of the acquired job transmission destination information,
further comprising: setting, in the acquired job transmission destination information, information for specifying a printing apparatus that should be set as a transmission destination of the print job if a data volume of the received print job exceeds a predetermined volume; and transmitting, if it is determined that the data volume of the received print job exceeds the predetermined volume, the print job only to the printing apparatus set in the job transmission destination information.

18. The non-transitory computer-readable storage medium according to claim 17, wherein the computer program causes the computer to further execute processing for:
acquiring, on the basis of the acquired job transmission destination information, operation information concerning an operation state of the printing apparatus that is the job transmission destination; and
transmitting, on the basis of the acquired operation information, the print job only to a printing apparatus having an operating ratio equal to or lower than a predetermined value.

* * * * *